Nov. 25, 1924.
R. E. RUNDELL
1,516,828
MACHINE FOR PREPARING FILLER FOR CIGAR MACHINES
Filed March 30, 1922 — 3 Sheets-Sheet 3
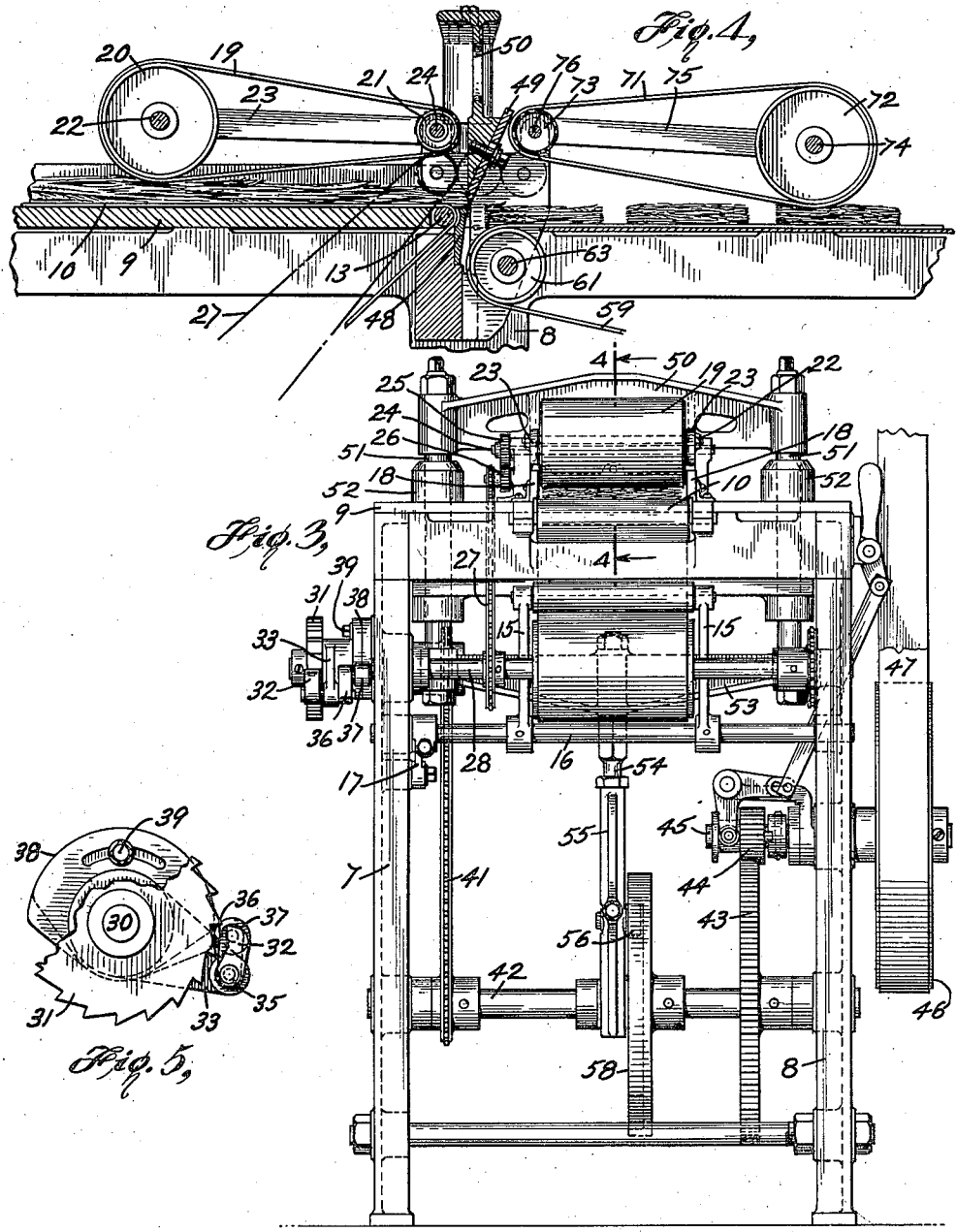

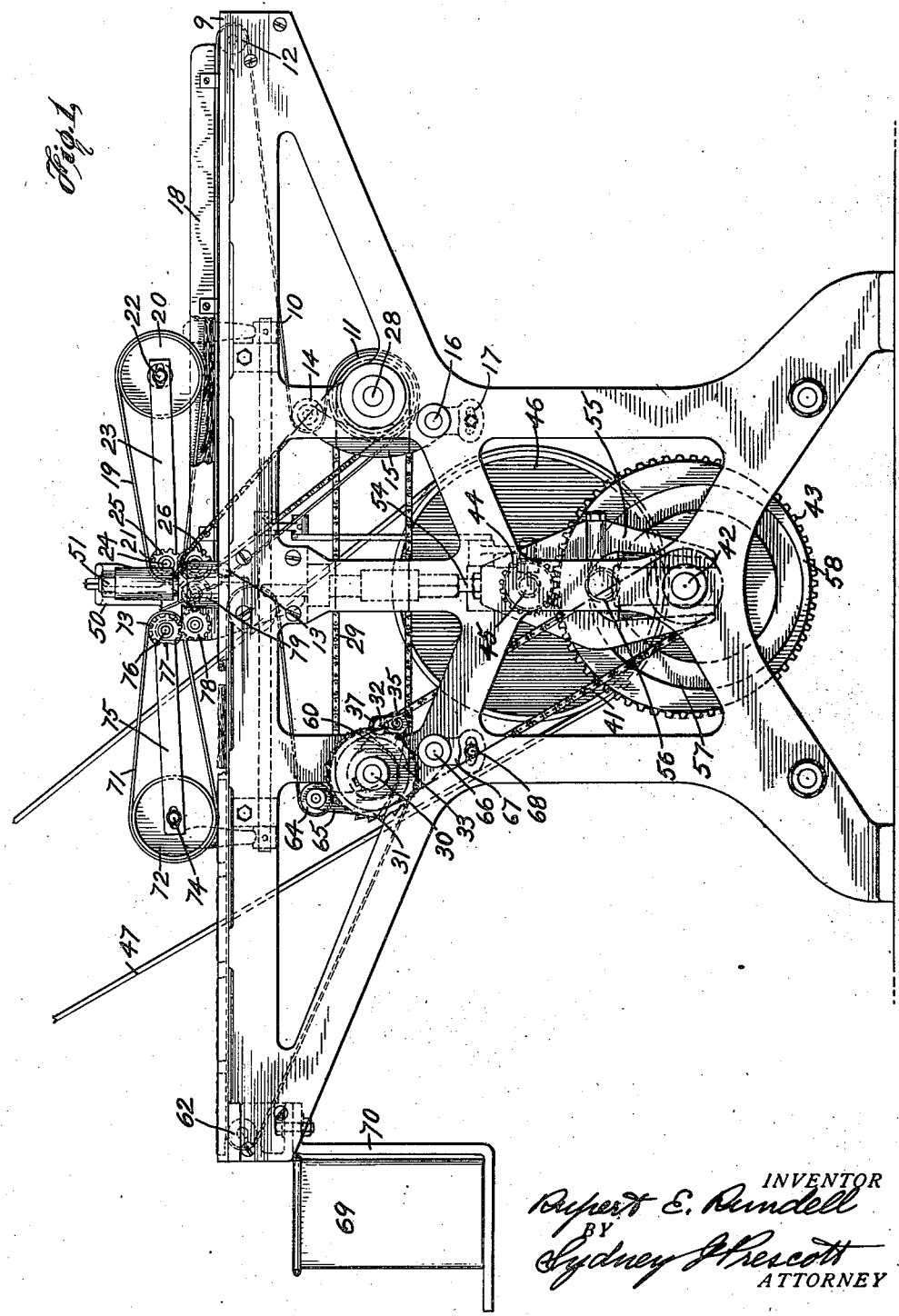

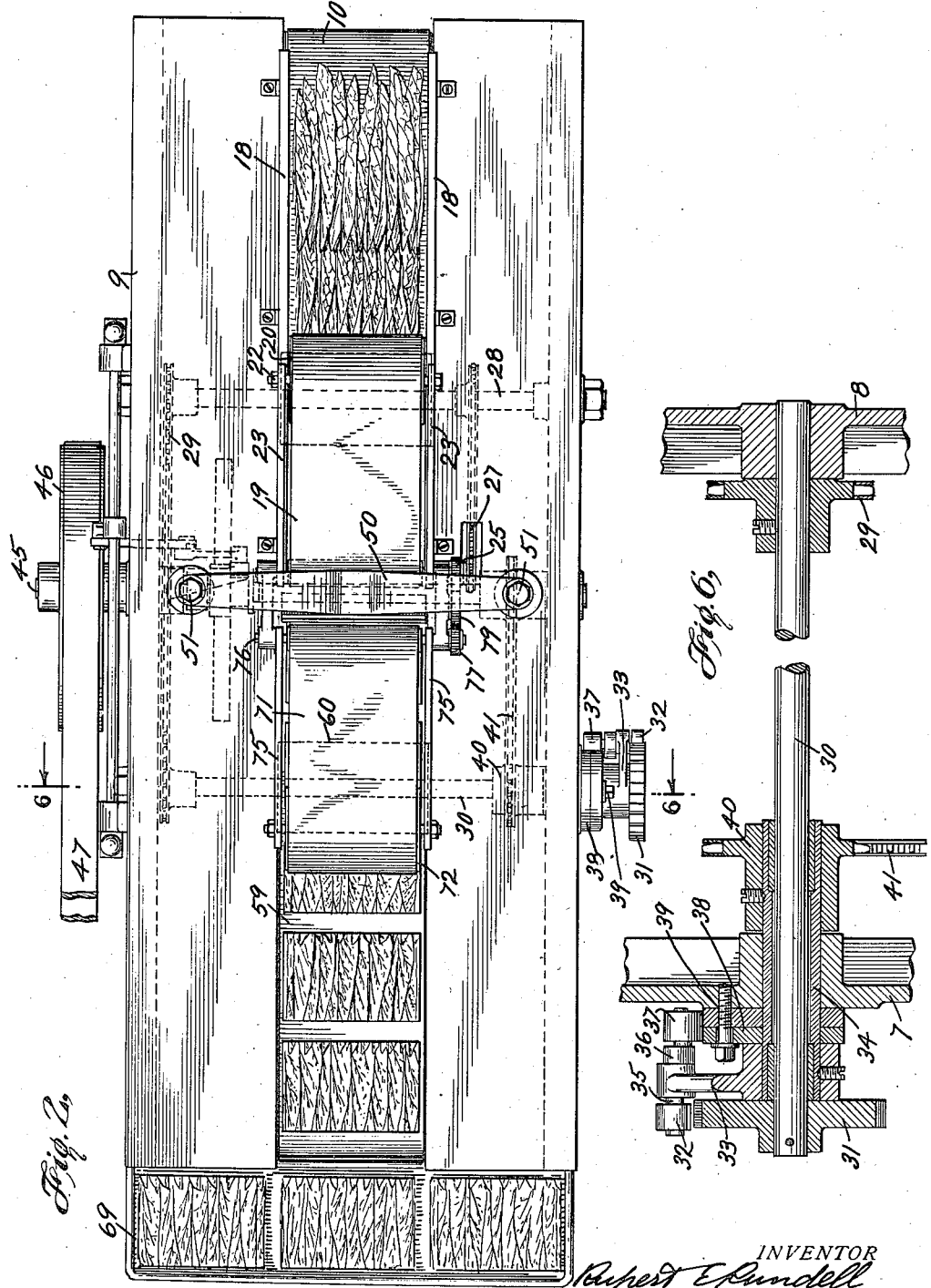

Patented Nov. 25, 1924.

1,516,828

UNITED STATES PATENT OFFICE.

RUPERT E. RUNDELL, OF BROOKLYN, NEW YORK, ASSIGNOR TO INTERNATIONAL CIGAR MACHINERY COMPANY, A CORPORATION OF NEW JERSEY.

MACHINE FOR PREPARING FILLER FOR CIGAR MACHINES.

Application filed March 30, 1922. Serial No. 547,948.

*To all whom it may concern:*

Be it known that I, RUPERT E. RUNDELL, a citizen of the United States, residing at Brooklyn, county of Kings, and State of New York, have invented a new and useful Improvement in Machines for Preparing Filler for Cigar Machines, of which the following is a specification.

This invention relates to a machine for preparing filler for cigar machines of the fresh work type.

The tobacco bunch filler material used on fresh work cigar machines comes to the machine in strip leaf form. The feed operator tears or breaks the leaves into lengths a little longer than the finished cigar is to be and places them transversely on the feed belt of the machine, thus forming a continuous sheet of filler material from which individual charges are cut, then enclosed in a binder, and finally enclosed within a wrapper. The feed operator must spread the filler material evenly upon the belt in order that the individual charges (and of course the resulting cigars) be of uniform density. Customarily these machines operate at the rate of 8 per minute so that the feed operator has but 7½ seconds in which to break up sufficient tobacco leaf to form one cigar bunch and place it in uniformity with the sheet of filler material on the feed belt. While these machines operate successfully, it has been found that a better product can be made by giving the feed operator more time in which to form a uniform sheet of filler material, and this the ultimate end sought in the production of the present machine which is separate from the cigar machine and operates to prepare the filler material in suitable lengths to be placed on the feed belt of a cigar machine, and thus give the feed operator the full 7½ seconds of time in which to form a uniform sheet, which is about double the time heretofore available for this purpose. The capacity of the filler preparing machine is many times that of the cigar machines, and one preparing machine is sufficient to prepare filler material for a number of cigar machines. With the proximate object of preparing filler for cigar machines, the ultimate object of improving the product of cigar machines, and other objects not specifically mentioned in view, the invention consists in certain constructions and combinations which will be hereinafter fully described and then specifically set forth in the claims hereunto appended.

In the accompanying drawings, which form a part of this specification and in which like characters of reference indicate the same or like parts, Fig. 1 is a side elevation of a machine constructed in accordance with the invention; Fig. 2 is a plan view of the structure shown in Fig. 1; Fig. 3 is an end view of the same structure; Fig. 4 is a sectional view taken on the line 4—4 in Fig. 3; Fig. 5 is a detail view of a pawl and ratchet mechanism used in the same structure; and Fig. 6 is a detail cross sectional view of the means for operating the pawl and ratchet mechanism shown in Fig. 5.

In carrying the invention into effect, there is provided means for advancing a sheet of filler material, and means receiving and severing said sheet into sections, which sections are stacked in suitable containers for transportation to the cigar machines in which they are used. The stacking of the sections removes the necessity for uniformly spreading the filler material in the advancing means and unskilled labor is sufficient for the operation of the machine. In the best constructions, the advancing means consists of a feed belt intermittently operated, and the receiving and severing means consists in a knife beyond the advancing means and intermittently operated while the advancing means is at rest. The means referred to may be widely varied in construction within the scope of the claims for the particular device selected to illustrate the invention is but one of many possible concrete embodiments of the same. The invention therefore is not to be restricted to the precise details of the structure shown and described.

Referring to the drawings, 7 and 8 are similar side frames which support a table 9. For the purpose of advancing a sheet of filler material, there is provided a belt 10 overrunning the table 9 and mounted on a drive pulley 11 and guide pulleys 12 and 13. For belt tightening purposes there is also provided an idle pulley 14 carried on adjustable arms 15 mounted on a shaft 16 extending across the frame and carrying an adjusting arm 17 of well known construction. For the purpose of confining tobacco on the belt 10, there are provided two side rails 18 secured to the table 9. The tobacco leaves are placed in overlapped condition on the belt 10, as shown in Fig. 2. To aid in advancing the tobacco, there is further provided a pressure belt 19 running over a pulley 20 and a pulley 21. The pulley 20 is loose on a shaft 22 carried by two arms 23—23 pivoted on a shaft 24, to which the pulley 21 is fast. The pressure on the tobacco exerted by the belt 19 is derived from the weight of the pulley 20 and arms 23. The shaft 24 is driven by a gear 25 which is in mesh with a gear 26 driven by means of a sprocket chain 27, deriving its motion from a shaft 28 which is the shaft upon which the pulley 11 is mounted. The shaft 28 is driven by means of a sprocket chain 29 which derives its motion from a shaft 30 extending across the machine with one end projecting outboard from the side frame 7. Upon this projecting end is secured a ratchet 31. The ratchet 31 is intermittently engaged by a pawl 32 carried on a pawl arm 33 secured to a sleeve 34 surrounding the shaft 30 and journaled in the side frame 7. The pawl 32 is mounted on a short shaft 35 carried by the pawl arm 33, and this shaft also carries an arm 36 provided with a bowl 37 tracking on a two-part adjustable fixed cam 38, held to the side frame 7 by means of an adjusting screw 39. The sleeve 34 projects inboard from the side frame 7 and upon its inboard projecting end is secured a sprocket 40 driven by a sprocket chain 41 deriving its motion from a shaft 42 extending across the machine and journaled in the side frames 7 and 8. The shaft 42 carries and is driven by a spur gear 43 which in turn is driven by a pinion 44 which forms a part of a clutch mechanism of ordinary construction mounted on a short shaft 45 journaled in the side frame 8 and driven by means of a pulley 46 and power belt 47. By means of the gearing described, the feed belt 10 and the pressure belt 19 are given an intermittent advancing movement which may be varied by re-adjustment of the two-part pawl and ratchet controlling cam 38. The sheet of filler material, as it is intermittently advanced by the feed belt 10 and pressure belt 19, is severed into sections at a point just beyond the pulley 13. At this point is located a shear plate 48 (see Fig. 4). And co-acting with this shear plate is a knife 49 angularly disposed upon the cross head 50 extending across the machine and carried on posts 51—51 which slide in long bearings 52 carried by the table 9 before referred to, the lower end of the posts being connected by a second cross head 53 (see Fig. 3). This cross head 53, and consequently the cross head 50 and knife 49, is reciprocated by means of an adjustable rod 54 connecting the cross head 53 with a fork 55 straddling the shaft 42 and carrying a bowl 56 tracking in a groove 57 sunk in the face of a cam 58 mounted on and driven by the shaft 42 before referred to. The cam mechanism controlling the movement of the severing device is so timed with respect to the pawl and ratchet mechanism controlling the movement of the feed and pressure belts that the knife comes into operation while the feed belts are at rest.

By means of the mechanism so far described, a sheet of filler material is advanced and cut into sections. Means are provided for receiving and carrying these sections away from the severing means, and this receiving and carrying means includes a delivery belt 59 running over the table 9 beyond the severing means and mounted on pulleys 60, 61 and 62, the pulley 60 being mounted on and driven by the shaft 30 before referred to. The pulley 61 is loose on a shaft 63 extending across the machine adjacent the shear plate 48. The belt 59 is tightened by means of a tightening pulley 64 carried on an arm 65 fast on a shaft 66 extending across the machine and provided with an adjusting screw 68, this tightening device being similar in all respects to that used in connection with the feed belt 10. The delivery belt 59 receives and carries the severed sections of the filler material to a point at extreme left of the machine, as shown in Figs. 1 and 2, where an attendant stacks them in a receptacle 69 supported by brackets 70 depending from the frame. When the receptacle is filled, it is removed from the brackets 70 and an empty one substituted.

There is further provided a pressure belt 71 running over a pulley 72 and a pulley 73, the pulley 72 being loose on a shaft 74 carried on arms 75 pivoted on the shaft 76 which carries the pulley 74. The shaft 76 is driven by a gear 77 which in turn is driven by a gear 78 in mesh with an idler gear 79 driven by the gear 25 before referred to.

By means of the mechanism just described, the delivery belt 59 and the pressure belt 71 are given intermittent movements in synchronism with the movements of the feed belt 10 and pressure belt 19. By an inspection of Fig. 4, it will be readily understood that when the angularly disposed knife comes down to sever the sheet of filler material advanced by the feed belt 10, it not only severs a section but kicks it forward a little upon the delivery belt 59. And while this is not an essential feature, it facilitates the manual operation of transferring the severed sections from the delivery belt 59 to the receptacle 69; and it may be further remarked that the pressure belt 71 is not an essential element of the structure and may be omitted. Its only function is to facilitate delivery of the severed sections in such manner that they may be easily handled.

In view of the foregoing, a detailed description of the operation of the device is deemed unnecessary and is therefore omitted in the interest of brevity.

What is claimed is:

1. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means.

2. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said advancing means including an intermittently traveling belt.

3. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said advancing means including an intermittently traveling belt and an intermittently traveling pressure belt overlying said sheet.

4. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said advancing means including means for exerting pressure on said sheet.

5. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said severing means including a shear plate and a knife and means for producing a relative movement of said plate and said knife whereby the severing action is effected.

6. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said severing means including a stationary shear plate and a movable knife and means for moving the latter to cause it to coact with said plate to effect the severing action.

7. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said carrying means including an intermittently traveling belt.

8. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said carrying means including an intermittently traveling belt and means for exerting pressure on the filler sections carried thereby.

9. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said carrying means including an intermittently traveling belt and an intermittently traveling pressure belt overlying the filler sections as they are carried away from the severing means.

10. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said carrying means being operative at a lower level than said advancing means.

11. A machine for preparing filler for cigar machines comprising means for advancing a sheet of superposed and overlapped tobacco leaves in the direction of their length, means for severing from said sheet individual filler sections substantially equal in length to the length of the cigars to be made, and means for carrying the severed sections away from said severing means, said carrying means being operative at a faster rate of speed than said advancing means.

12. In a machine for preparing filler for cigar machines, the combination with a feed belt, of a pressure belt overlying said feed belt, a cross head beyond said feed belt, a knife angularly disposed on said cross head, a delivery belt beyond said cross head, gearing including a pawl and ratchet mechanism for simultaneously and intermittently operating said belts, and cam actuated means for reciprocating said cross head while said belts are at rest to cause said knife to sever into sections a sheet of filler material advanced by and between said feed belt and said pressure belt.

In testimony whereof, I have signed my name to this specification.

RUPERT E. RUNDELL.